United States Patent [19]

Ahlers

[11] 4,148,285
[45] Apr. 10, 1979

[54] FUEL ATOMIZING DEVICE AND METHOD FOR GASOLINE ENGINE

[75] Inventor: William P. Ahlers, St. Cloud, Minn.
[73] Assignee: Fuel Systems of Minnesota, Duluth, Minn.
[21] Appl. No.: 772,353
[22] Filed: Feb. 28, 1977
[51] Int. Cl.$^2$ ............................................. F02M 23/12
[52] U.S. Cl. ........................... 123/119 D; 123/124 R; 123/141; 261/79 R; 48/180 A
[58] Field of Search ................ 123/141, 124 R, 119 D, 123/119 D B; 48/180 A, 180 R; 261/76, 78 R, 79 R, DIG. 19

[56] References Cited

U.S. PATENT DOCUMENTS

| 3,395,899 | 8/1968 | Kopa | 123/141 X |
| 3,961,615 | 6/1976 | Poslek et al. | 123/141 X |
| 3,990,421 | 11/1976 | Grainger | 123/119 D X |

FOREIGN PATENT DOCUMENTS

| 700213 | 2/1931 | France | 123/141 |
| 380716 | 1932 | United Kingdom | 123/119 D |

*Primary Examiner*—Ira S. Lazarus
*Attorney, Agent, or Firm*—Leo Gregory

[57] ABSTRACT

The invention herein consists of a plate-like member disposed between the carburetor and the intake manifold of an internal combustion engine and has a bore therethrough in register with the throat of the carburetor and the intake of the manifold. The plate-like member has an unobstructed annular air inlet into its bore and a passage across the bore having a jet nozzle axially of the bore directed at the intake of the manifold, the air stream from the annular inlet diverts the fuel and air mixture from the carburetor to be confined centrally of the bore and the jet stream of air from the jet nozzle creates a virtual venturi to cause the incoming fuel and air mixture to flow directly through the core of the intake of the manifold without engaging the side walls thereof, the impact of the intersection of the air stream from the annular inlet and the jet stream together with the fuel and air mixture from the carburetor causes a cyclonic action which further atomizes the fuel and air mixture and increases its homogeneity upon entering the intake of the manifold for a more complete combustion thereof than otherwise.

1 Claim, 7 Drawing Figures

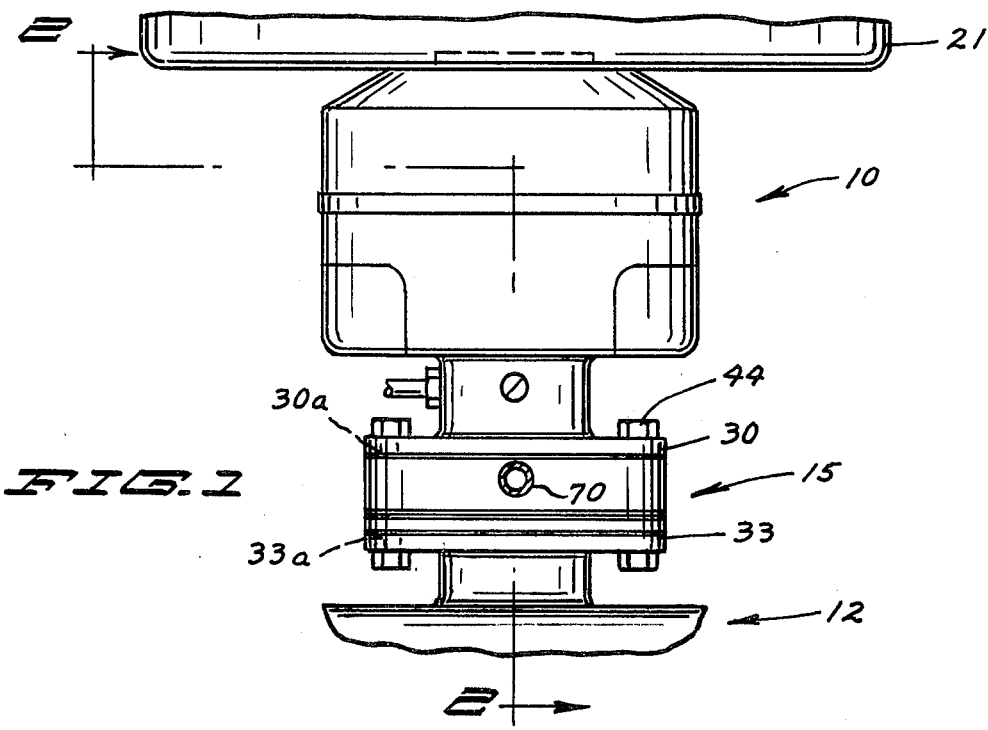
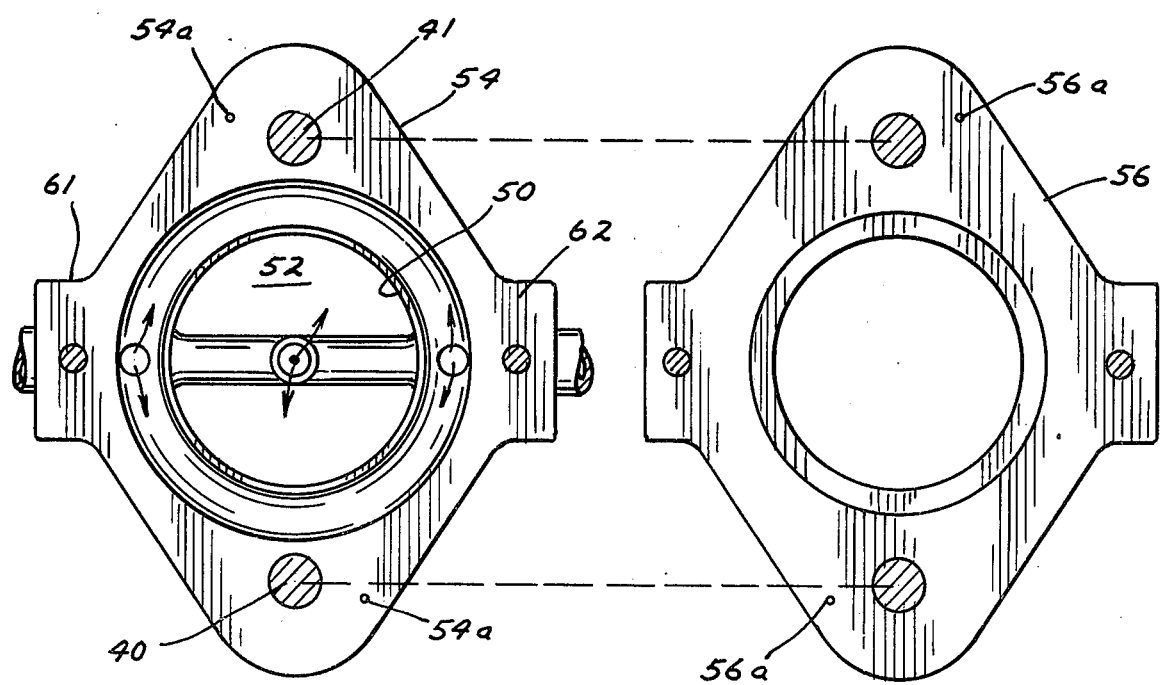

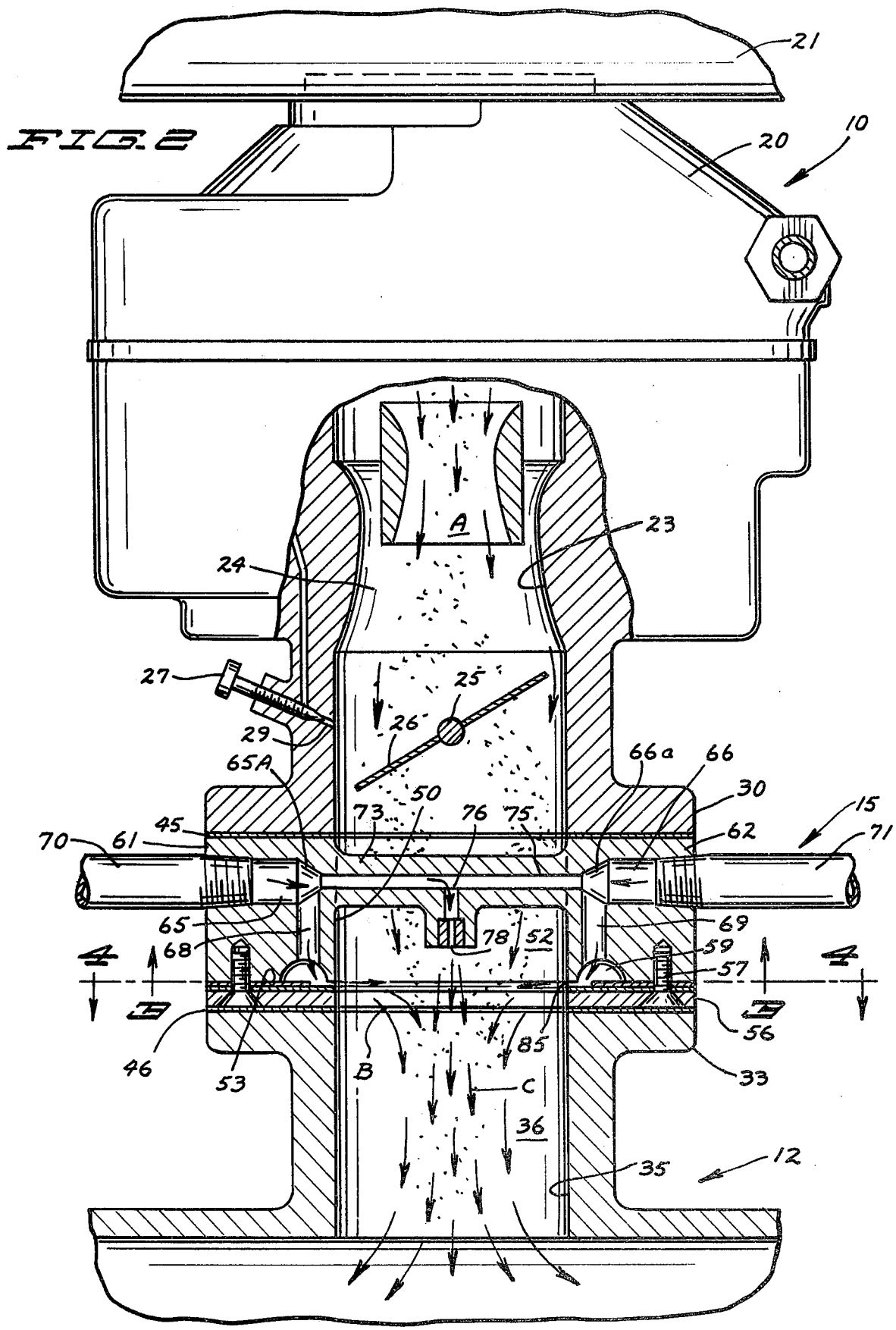

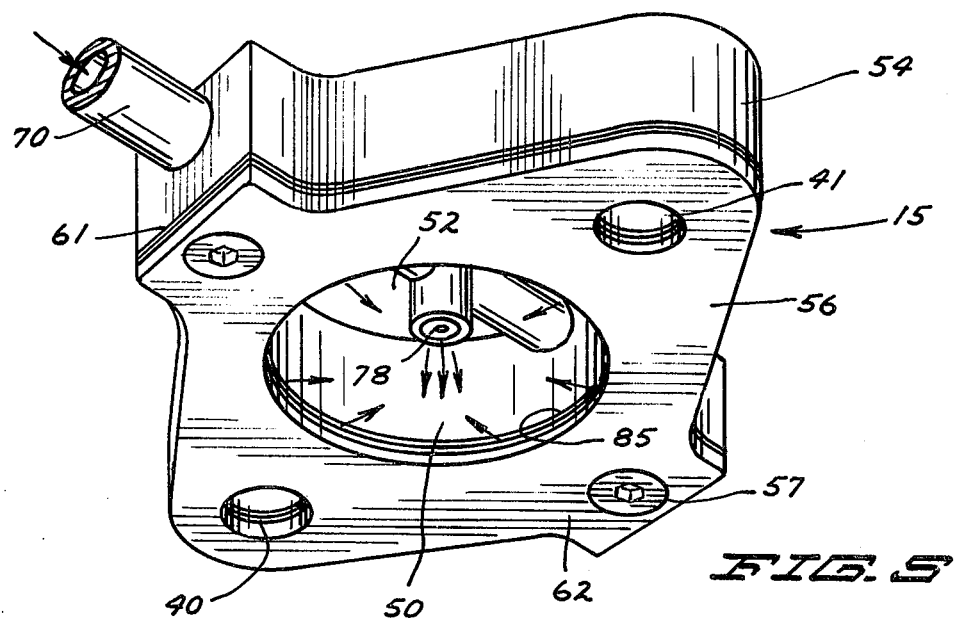
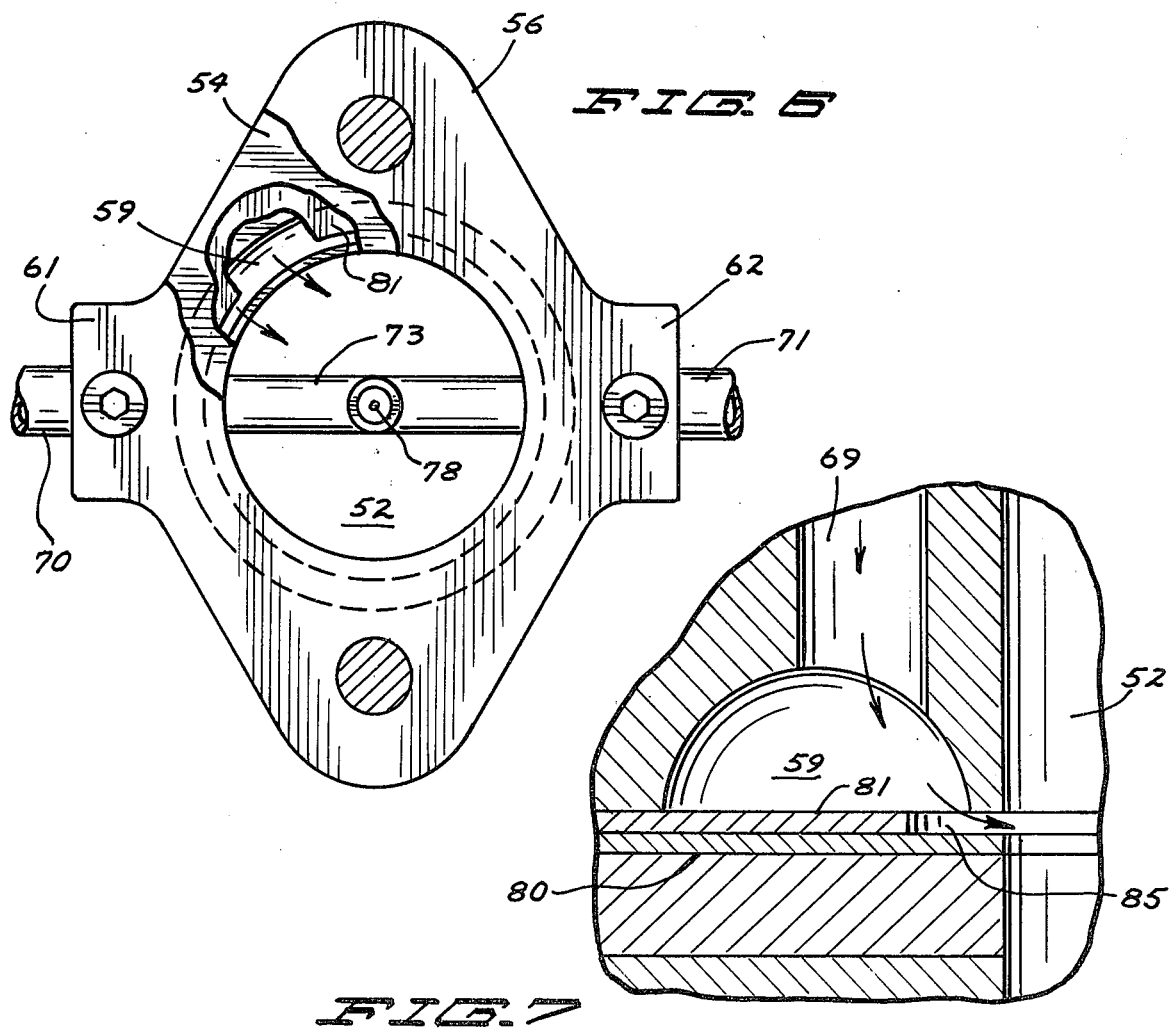

FUEL ATOMIZING DEVICE AND METHOD FOR GASOLINE ENGINE

BACKGROUND AND SUMMARY OF THE INVENTION

The invention herein relates to an improvement in further atomizing the mixture of fuel and air from the carburetor of an internal combustion engine in its passage into the inlet of the intake manifold and substantially improving the homogenization of said mixture and to provide a higher ratio of air to the fuel mixture than otherwise.

The result of improved atomization and of homogenization is a more uniform mixture of fuel and air providing improved combustion of the fuel mixture resulting in improved gasoline mileage, a smoother engine performance and a decrease in the quantity of pollutants discharged through the exhaust system.

Much effort has been made in the prior art in an attempt to achieve the improvements indicated as resulting from the invention herein. An example of such effort is disclosed in the prior art type of device set forth in U.S. Letters Pat. No. 1,118,865 issued Nov. 24, 1914 to D. E. Johnston et al in which an annular series of perforations are used to introduce additional air but perforations such as these are too restrictive to achieve the desired results and the structure herein represents a substantial improvement.

It is an object of this invention therefore to provide a device comprising an attachment supplementary to the carburetor of a gasoline engine improving the atomization and homogenization of the fuel-air mixture in the movement of said mixture from the carburetor to the intake manifold.

It is another object of this invention to provide a device comprising an attachment supplementary to a carburetor of a gasoline engine which causes the fuel-air mixture to pass from the carburetor and to become concentrated centrally axially of the bore of said device in passing from said carburetor to the intake manifold.

It is a further object of this invention to provide a substantially flat plate-like device supplementary to the carburetor of a gasoline engine which underlies the carburetor and has a passage therethrough in register with the passage from the carburetor and with that of the inlet of the underlying intake manifold, said passage of said device having an annular unobstructed air inlet thereabout and a diametrical air passage thereacross having a jet air outlet directed downstream of said passage in the direction of said intake manifold whereby a low pressure area or virtual venturi is created drawing the fuel-air mixture from the carburetor into the core of said passage, a vortex being created by said jet air outlet concentrating said fuel-air mixture centrally axially of said passage into said intake manifold and there being an attendant cyclonic action which effectively increases the atomization and homogenization of the fuel-air mixture.

These and other objects and advantages of the invention will be set forth in the following description made in connection with the accompanying drawings in which like reference characters refer to similar parts throughout the several views and in which:

FIG. 1 is a fragmentary view in front elevation;

FIG. 2 is a fragmentary view in vertical section with some parts being broken away;

FIG. 3 is a view in horizontal section taken on line 3—3 of FIG. 2 as indicated;

FIG. 4 is a view in horizontal section taken on line 4—4 of FIG. 2 as indicated;

FIG. 5 is a view in perspective of the device herein;

FIG. 6 is a bottom plan view of the device herein with portions thereof being broken away and a portion thereof being in dotted line; and FIG. 7 is a fragmentary view in vertical section on an enlarged scale showing a detail of structure.

DESCRIPTION OF A PREFERRED EMBODIMENT

Referring to FIGS. 1 and 2, there is indicated generally a commonly used type of carburetor 10 shown in superposed relation to an intake manifold 12 and disposed therebetween is the device 15 which comprises the structure of the invention herein.

Only as much structure of the carburetor and intake manifold is shown as is believed necessary for a description of the invention herein and for the operative relationship therewith.

Said carburetor 10 has in connection therewith a housing 20 and an air cleaner 21 mounted thereon. Said housing 20 has a portion thereof broken away to show the bore or barrel 23 therein which has a fuel-air mixture passage 24 therethrough and having therein a throttle valve 26 mounted on a pivot pin 25 and shown entering said barrel is a needle valve 27 regulating an idler port 29. At the bottom of said carburetor is an annular base or mounting flange 30.

Disposed beneath said carburetor spaced therefrom is said intake manifold 12 having an upper or mounting flange 33 adapted to mate with said flange 30 and having a bore 35 therein defining an inlet passage 36 which is in alignment with said passage 24 of said carburetor.

Interposed between said carburetor flange 30 and said intake manifold flange 33 is said device 15 which is substantially flat plate-like in form as here shown and which will be described in detail.

The configuration in plan of said device 15 is preferably substantially that of said flanges 30 and 33 to conform thereto to in being interposed therebetween and is here shown being somewhat elliptical in form. Said device 15 has holes 40 and 41 therethrough in alignment with like holes 30a and 33a in said flanges 30 and 33 to receive studs 44 securing said device between said flanges. Said studs in a shorter length would otherwise secure said carburetor to said manifold. Appropriate gaskets 45 and 46 are disposed at each side of said member 15 sealing the same to said flanges 30 and 33.

Said device 15 has a bore 50 therethrough defining a passage 52 which is in register with said passages 24 and 36. Said device 15 comprises an upper housing portion 54 of some thickness and an underlying relatively thin cover plate 56 secured thereto as by screws 57. Said member 54 has a pair of spaced positioning pins 54a to be disposed in the holes 56a of plate member 56 to have the portions 54 and 56 in register.

Formed within the bottom wall 53 of said upper housing portion 54 about said bore 50 is an open bottomed annular channel or chamber 59 substantially semi-circular in transverse section as here illustrated.

A pair of bosses 61 and 62 project outwardly at either side of said device 15 in the direction of the shorter transverse dimension thereof and the same have inlet air ports 65 and 66 in communication with said annular passage 59 by means of the vertical passages 68 and 69 extending from the inner ends 65a and 66a of each of said ports to said annular passage 59 as best shown in FIG. 2. Said air ports are open to the atmosphere and may have projecting extensions such as the tubular extensions 70 and 71 indicated in FIG. 2 and the same may be threaded therein as shown or press fit. It will be understood that one of said ports may be sufficient.

Means extending across said bore 50 comprises a strut 73 in alignment with said ports 65 and 66 and having a passage 75 therethrough in communication with said ports.

Said strut 73 has a downward passage 76 extending from said passage 75 centrally longitudinally thereof having a restricted outlet 78 such as jet nozzle or small orifice. The size opening of said outlet may be on the order of 0.030 to approximately 0.040 inches.

Referring particularly to FIGS. 2 and 7, disposed between said housing portions 54 and 56 are shown a pair of gaskets 80 and 81. Both of said gaskets are flush with the outer perimeter of the housing 20. As shown best in FIGS. 2 and 7, the lower gasket 80 is flush with the bore 52. The gasket 81 is recessed or set back from said bore 52 as is clearly shown in FIG. 7 to form an unobstructed annular passage or slot 85 for the free flow of air from channel 59 into said passage 52. Said annular passage or slot 85, by way of example, may be on the order of 0.006 inches in height or thickness and may be varied by the insertion of an alternate gasket 81 having a thickness precisely the height of the desired opening of said passage or slot 85 with respect to a particular gasoline engine. The particular size of said slot is a matter of a design requirement.

OPERATION

The essential purpose of the invention herein is to improve the atomization of the fuel-air mixture A passing from the carburetor of a gasoline engine during operation into the intake manifold thereof for distribution to the cylinders. In addition to improving the atomization, the invention herein also results in providing a more homogenous mixture of fuel and air. Further, there is a beneficial change in the ratio of fuel to air mixture. The invention herein in improving the atomization of the fuel-air mixture also introduces more air into said mixture through the passage 85 and the jet outlet 78 thereby increasing the ratio such as of a common ratio of air to fuel on the order of 14:1 to an air to fuel ratio on the order of 18:1 to 20:1. The ratio of air to fuel is well understood in the art. Thus there results a leaner mixture than otherwise, it results in fuel saving and results in a lesser amount of pollutants being discharged through the exhaust system.

Referring to the drawings in the above description, in looking at FIG. 1, it is seen that the fuel-air mixture passes directly through the barrel or throat of the carburetor and but for the presence of the device 15 it would pass directly into the intake manifold. It has been found that this mixture passing through the carburetor has a tendency to have a substantial portion thereof engage the walls of the passage 24 through the carburetor and of the passage 36 into the intake manifold and this quantity of the mixture passing along the walls is not fully utilized. There are also heavy ends or molecules in the gasoline, as is well known, which require an unusual degree of atomization for combustion.

With said device 15 being positioned between the carburetor and the intake manifold, the action of the engine creates very substantial suction and draws outside air inwardly of the ports 65 and 66 through the passages 68 and 69 and through the annular unobstructed slot or passage 85 into the passage 52 and said air enters said passage in effect as an annular curtain as indicated by B. At the same time the air entering through the ports 65 and 66 passes with great velocity through the passages 75 and 76 and through the jet outlet or nozzle 78 downwardly centrally of the passage 52 and is indicated as C. The jet stream C thus coming from the nozzle 78 creates a lower pressure area or vortex directly below and about said nozzle 78 and this jet in effect impacts and deflects downwardly the central portion of the curtain of air B coming in through the unobstructed annular slot 85 and thus forming a pocket to draw in the fuel-air mixture. The lowered pressure at the nozzle 78 and the vortex created at this point draws the fuel-air mixture coming down from the carburetor passage 24 into a concentration through the core or axial center of passage 52 so that the entire fuel-air mixture A is drawn away from the wall surface of the passage 52 into the core or central area thereof and by means of the jet 78 and the air stream coming in from the slot 85, there results a cyclonic or turbulent action as the streams B and C impact the stream A. The air stream B from the slot 85 enters the passage 52 at a greater velocity than the fuel-air mixture from the carburetor. The air stream C passing out of the jet nozzle 78 has such a relatively great velocity as to create a virtual venturi forming the vortex drawing therein the fuel-air mixture from said carburetor under a cyclonic action. The result of the impacting streams causes a further atomization of the fuel-air mixture together with the introduction of more air into the mixture and the cyclonic action also results in a more homogenous mixture whereby the fuel-air mixture with an increase in the air to fuel ratio proceeds into the intake manifold centrally thereof without the loss of any fuel by adherence to the walls of the passage of the intake manifold.

As above described the slot 85 may be sized to be appropriate for any particular engine. The fuel-air mixture A in effect as it enters the passage 52 and passes through to the intake manifold passage 36 increases in velocity.

To have an improved atomization of the fuel-air mixture it requires a cyclonic or turbulent action and not just a compatible juncture of two streams. The air passing into the fuel-air stream coming down from the carburetor and it is sufficient to result in improved atomization as described. It will be understood that the speed of the motor has a great deal to do with the suction created by the action of the motor and of its effect in drawing air through the slot 85. Hence as the motor speeds up in its action there will be an increase of air drawn in through the slot 85 for a more significant impact on the fuel-air mixture passing through from the carburetor.

The passage through the device 15 is of short length but the action described above takes place directly in the vicinity of the jet nozzle 78.

The device herein has been tested in actual operation and has resulted in findings which support the description and operation given herein.

The invention as herein described is readily seen to be adapted for installation in internal combustion engine as an attachment thereto in the after or retrofit market.

It will of course be understood that various changes may be made in the form, details, arrangement and proportions of the product and in the steps and sequence of steps of the method without departing from the scope of the invention herein which, generally stated, consists in a device and method capable of carrying out the objects above set forth, such as disclosed and defined in the appended claims.

What is claimed is:

1. In an internal combustion engine having a carburetor superposed in relation to an intake manifold and having a fuel-air mixture passing therethrough during operation and a substantially flat plate-like device interposed between said carburetor and said intake manifold, the improvement herein comprising said plate-like device having a bore therethrough and having a single annular channel about said bore, said bore having a passage therethrough in register with the passage in said carburetor and with the passage in said intake manifold, said channel being formed in an upper portion of said device, a spacing member underlying said upper portion of said device and said channel spacing the same from a lower underlying portion of said device and having an opening therein in register with and set back from the inner portion of said channel forming an unobstructed passage from said channel into said bore, said plate like device having an unobstructed inlet port for communication between the atmosphere and said annular channel, a strut disposed across said bore having a passage therethrough communicating with said inlet port, said last mentioned passage having an air passage having a restricted outlet in the direction of said intake manifold, whereby said air passing through said restricted outlet and through said annular channel as a result of engine induced suction enters said passage of said plate-like device at a greater velocity than that of the fuel-air mixture from said carburetor thereby creating a cyclonic action and said fuel-air mixture is impacted for further atomization, and said restricted outlet creating a virtual venturi causing said fuel-air mixture to pass into said intake manifold substantially centrally of the passage therein.

* * * * *